Figure 1:
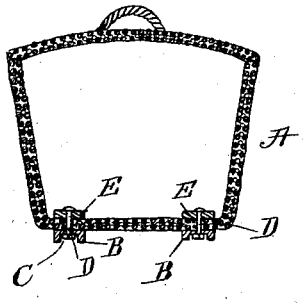

(No Model.)

J. GOLDSMITH.
PROVISION BASKET.

No. 387,639. Patented Aug. 14, 1888.

Witnesses:
W. E. Bowen
William Cook

Inventor
James Goldsmith
by Phillips Abbott,
his Attorney.

UNITED STATES PATENT OFFICE.

JAMES GOLDSMITH, OF NEW YORK, N. Y.

PROVISION-BASKET.

SPECIFICATION forming part of Letters Patent No. 387,639, dated August 14, 1888.

Application filed June 25, 1888. Serial No. 278,184. (No model.)

*To all whom it may concern:*

Be it known that I, JAMES GOLDSMITH, a citizen of the United States, and a resident of New York city, in the county of New York and State of New York, have invented certain new and useful Improvements in Provision-Baskets, of which the following is a specification.

My invention relates to improvements in rattan, reed, willow, fiber, and papier-maché baskets of the class known as "provision baskets," or "hampers." Baskets of this class are very large and heavy, and are used principally in the large markets, slaughter-houses, and fish-houses for holding and transporting meat and sometimes vegetables in bulk, and since they are used by a very rough class of men they are subjected to very destructive treatment, and unless they are made in an exceedingly strong manner they are very soon smashed to pieces, or so battered out of shape and partially destroyed that they become valueless.

The requisites of a substantial provision-basket are the following, and for the following reasons:

First. They must have wooden bars of considerable thickness—not less than about half an inch, and preferably more—extending lengthwise across the under side of their bottoms, upon which the baskets shall rest, so that the bottom of the basket will be elevated above the floor, and thus protected from the wet, greasy, and frequently muddy deposits which accumulate in such places, and also the heads or nuts of the bolts which fasten these bars to the basket must be countersunk in the bars, otherwise they will tear the boarding of the floor, as the baskets, which frequently weigh two hundred and fifty pounds when full, are pulled about over them.

Second. These supporting-bars should run lengthwise of the basket, from handle to handle, so that they may act as runners or slides on which the basket may move.

Third. These bars should be comparatively narrow strips, and not in the form of a continuous board on the under side of the basket, because if so the weight of the basket will be greatly increased, and also, principally, because the continuous board will very soon be saturated with the greasy moisture of the market or slaughter-house and become slimy and otherwise foul. This is especially true in fish-markets, and this fouling not only renders the basket unfit to contain food, since the food thereby becomes tainted with the foul odors of the basket, but also the material of the basket becomes soft and pliable, thus the basket soon gets out of shape and very soon rots. On the contrary, when the bars are used they are so narrow—usually from an inch to two inches wide—that all the space between the bars is kept dry, and the bars themselves, being of hard wood, do not absorb much moisture, and such as they do absorb soon evaporates owing to the free circulation of air on all sides of such narrow strips.

The foregoing requisites of a good provision-basket have been long recognized, and for several years they have been constructed as above recited; but it is found that baskets so made are nevertheless defective in the following particulars: The bars on the under sides of the bottom during use receive many and severe lateral blows, and the force of these blows is transmitted through the bolts to the material of which the basket is made on the upper side of the bottom within the basket, and since each of the heads of the bolts or the washers under the nuts, as the case may be, rest upon a small portion only of the material of which the basket may be made, these particular parts soon become broken or crushed and the bar works loose and they are soon torn away entirely, ripping holes in the bottom of the basket; also, for the same reason, as above stated, that the heads or washers of the bolts rest on a small part only of the material of which the basket is made, it has been found undesirable to screw the bolts up as firmly as they might be when the basket is first made, for fear of crushing the basket material by the squeeze of the bolts themselves. Thus when the basket is subjected to heat, as is frequently the case, the shrinkage of all the parts loosens the bars, which were not, even in the first place, screwed to the bottom as firmly as they would have been were it not for the reasons stated; also, it has been found that when the baskets are a little old the bottom loses its rigidity, and that being the backbone of the basket, so to speak, it begins to lose its shape and to bend badly when handled with a heavy load in it.

The improvements therefore which I secure by my invention are the avoidance of the defects above recited, and I accomplish this in the following manner:

In order that the squeeze of the bolts may be sustained, not by the small portion of the basket material immediately under their heads or washers only, but by practically the entire bottom of the basket, thus enabling the bolts to be screwed up to their utmost without danger of crushing the basket material, and also so that the force of the lateral blows on the bars may be distributed over a large part of the bottom, I place directly over the bars and on the inside of the bottom of the basket a continuous stiff piece of metal, preferably stiff hoop-iron, which is practically as long as the bar beneath the bottom, and I provide holes in the strip of iron through which the bolts pass. Thus the pressure is distributed on all the bottom of the basket from one end to the other of the metal strip. Sometimes, also, especially when the basket is made of wicker-work, to compensate for the unevenness of the bottom, I place under the metal strip an elastic cushion, which may be made of firm cow-hair felt, paper, or the like body, which still further equalizes and distributes the pressure; and in order that the bottom of the basket may be stiffened I sometimes, instead of using narrow strips of metal only above the bars, employ a continuous plate of metal which extends over the entire bottom of the basket, through which, near the sides, the bolts from the bars pass; and other bolts may also be employed, passing through its central and end portions, whereby it will be held to the bottom at all points, thus greatly stiffening the bottom. This metallic plate may be made of lighter metal than would otherwise be necessary if it be corrugated to stiffen it. I sometimes also employ a continuous sheet of the cushioning-felt or like material under the continuous metallic plate, as well as under the strips, and for the same purposes.

I secure the additional advantage, when the continuous metallic plate is employed, that thereby the bottom of the basket can be easily cleaned.

In the drawings the same reference-letters indicate the same parts in all the figures.

Figure 2:
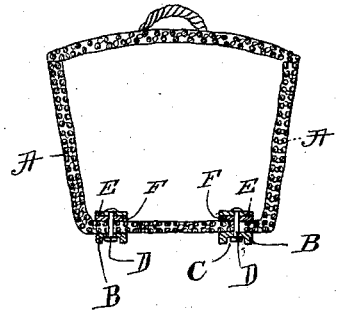
Figure 3:
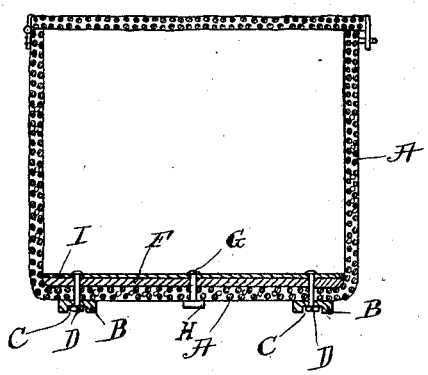
Figure 4:
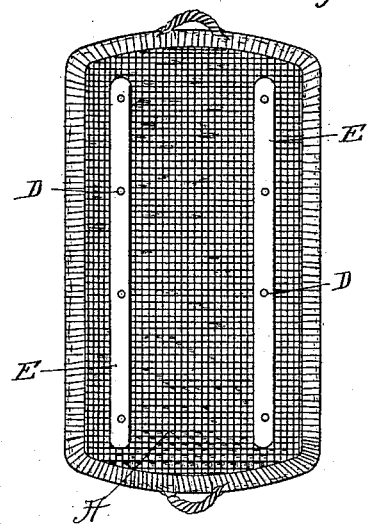

Figure 1 illustrates a vertical cross-section of my basket, showing the strips and bars without cushion. Fig. 2 illustrates the basket shown in Fig. 1, with a cushion under the strips. Fig. 3 illustrates a vertical cross-section of a covered meat-hamper embodying my invention, with the continuous metallic plate over the bottom and provided with a cushion. Fig. 4 illustrates an interior view of the basket shown in Fig. 1.

A is the basket. B B are the bars. C C are the countersunk holes or recesses for the reception of the heads or nuts of the bolts. D D are the bolts. E E are the metallic strips on the interior of the bottom. F F are the cushions. G is a central line of bolts in the continuous plate, and H is a strip of metal put on the under side of the bottom for the same reason that the strips E are put on the inside thereof. I is the continuous plate covering the bottom of the basket. A cover is shown in Figs. 1 and 2, and in Fig. 3 the cover is hinged to the basket at one side.

It is obvious that rivets or clinch-nails or their equivalent may be used instead of bolts.

Having described my invention, I claim—

1. A basket having longitudinally-running bars on the under side of the bottom, continuous strips placed over the bars on the inside of the bottom, cushioning material between the basket and the strips, and fasteners which pass through the bars and the bottom of the basket and the strips, substantially as and for the purposes set forth.

2. A basket having longitudinally-running bars on the under side of the bottom, a metallic plate covering the inside of the bottom, and fasteners passing through the bars and the bottom of the basket and the metallic plate, substantially as set forth.

3. A basket having longitudinally-running bars on the under side of the bottom, a metallic plate covering the inside of the bottom, a cushion between the bottom and the metallic plate, and fasteners passing through the bars and the bottom of the basket and the cushion and the plate, substantially as set forth.

Signed at New York, in the county of New York and State of New York, this 19th day of June, A. D. 1888.

JAMES GOLDSMITH.

Witnesses:
PHILLIPS ABBOTT,
WILLIAM ECK.